(No Model.)
W. CALVER.
SOLAR REFLECTING APPARATUS.
No. 412,724. Patented Oct. 15, 1889.
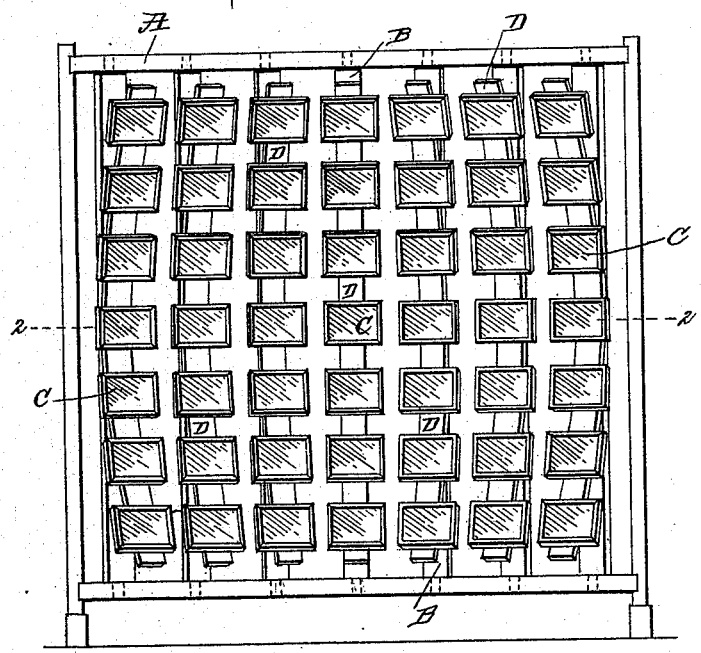
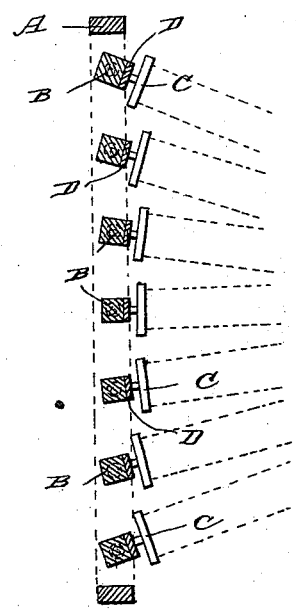
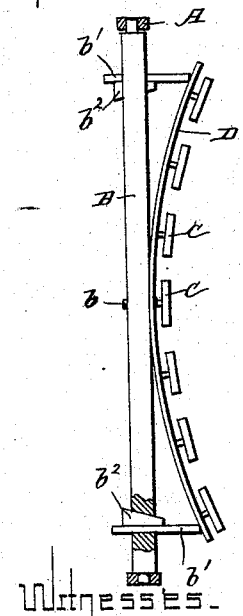
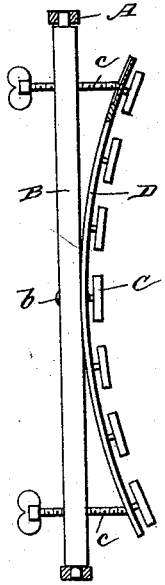
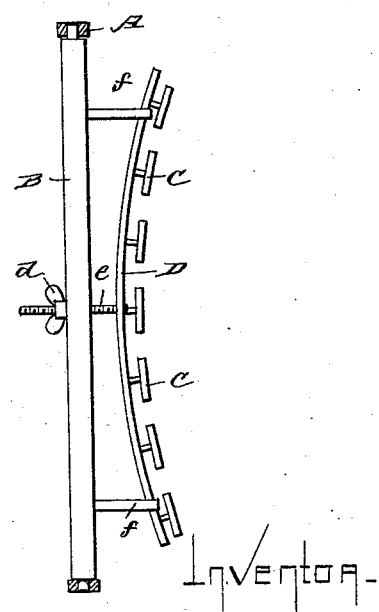
Witnesses:
E. D. Smith
Henry Calver
Inventor
William Calver

UNITED STATES PATENT OFFICE.

WILLIAM CALVER, OF WASHINGTON, DISTRICT OF COLUMBIA.

SOLAR REFLECTING APPARATUS.

SPECIFICATION forming part of Letters Patent No. 412,724, dated October 15, 1889.

Application filed December 31, 1888. Serial No. 294,992. (No model.)

*To all whom it may concern:*

Be it known that I, WILLIAM CALVER, a citizen of the United States, residing at Washington, in the District of Columbia, have invented certain new and useful Improvements in Solar Reflecting Apparatus, of which the following is a specification, reference being had therein to the accompanying drawings.

My invention relates to certain improvements on the solar reflecting apparatus embraced by my patent, No. 260,657, dated July 4, 1882, the object of my present invention being to provide mirror-frames of such construction that the reflected rays from the mirrors can be easily focused and the mirrors be readily and conveniently adjusted to any desired positions.

To this end the mirrors are supported by pivoted bars within a suitable frame, so that a set or series of mirrors carried by a bar can be simultaneously adjusted or turned in focusing the reflected solar rays. The mirrors may be jointed directly to the pivoted bars by joints which are at right angles to the pivots of the bars, if desired; but they are preferably attached to flexible strips of wood or other suitable material capable of being bent or curved so as to focus the rays from a series of mirrors, these strips being in turn attached to the pivoted bars and the latter being provided with adjusting appliances for giving any desired degree of curvature to the flexible mirror-carrying strips.

In the accompanying drawings, Figure 1 is a front view of one of my improved mirror-frames. Fig. 2 is a section of the same on line 2 2, Fig. 1. Figs. 3, 4, and 5 are detail views showing different ways of adjusting the mirror-carrying strips relative to their supporting-bars.

A denotes the supporting-frame for the mirrors, and B the mirror-supporting bars pivoted at their ends in said frame, which latter may be mounted on a truck or carriage, so as to be automatically moved to follow the movements of the sun, as provided for in my patent above referred to, if desired. The mirrors C are preferably secured to flexible strips D, attached to the sustaining-bars B, in such a manner that they may be bent or bowed to focus the rays reflected by the set of mirrors attached to each strip.

The adjusting appliances for bending a mirror-carrying strip are represented in detail in Figs. 3, 4, and 5. In Fig. 3 the strip is attached to its bar B at its center by a bolt $b$, said bar being mortised for the passage of push-bars $b'$ and holding-wedges $b^2$ for said push-bars. In adjusting or curving the mirror-carrying strip by the devices shown by this figure the push-bars are forced against the strip until the latter is properly curved, and the securing-wedges are then driven in tightly to hold the push-bars in the position to which they have been adjusted. In the device shown by Fig. 4 the mirror-carrying strip is curved by turning in the thumb-screws $c$, passing through the bar B and abutting against the strip C near the ends of the latter; and in the device shown in Fig. 5 the mirror-carrying strip is bent to any desired curvature by turning the thumb-nut $d$ on the bolt $e$, secured to the strip C at or near the middle of the latter, and passing loosely through the bar B, the ends of said strip C being held away from the said bar B by the projections $f$.

From the foregoing it will be readily understood that all of the mirrors on a mirror-frame can be easily and quickly adjusted to focus the solar rays reflected therefrom by turning the bars B on their pivots and by curving the flexible strips by means of the adjusting appliances shown.

Although I have herein shown the bars B as having vertical pivots to concentrate the rays horizontally, it will be understood that the same results would be secured if they were pivoted horizontally to concentrate the rays vertically, the concentration of the rays in the direction of the pivots of the bars being in either case effected by bending the flexible mirror-carrying strips.

The mirror-carrying strips, instead of being of flexible material, as above described, may be rigid and be permanently curved to secure a desired focus for a predetermined distance, and this will be preferable for a permanent apparatus not requiring adjustment.

Having thus described my invention, I claim and desire to secure by Letters Patent—

1. In a solar reflecting apparatus, the combination, with a mirror-supporting frame, of a series of mirror-sustaining bars pivoted to said frame and each provided with a mirror-carrying strip, and a series of mirrors carried by each of said strips, substantially as set forth.

2. In a solar reflecting apparatus, the combination, with a mirror-supporting bar, of a curved or flexible mirror-carrying strip attached to said bar, and a series of mirrors carried by said strip, substantially as set forth.

3. In a solar reflecting apparatus, the combination, with a mirror-supporting bar, of a flexible strip attached thereto, a series of mirrors carried by said strip, and adjusting appliances for bending the mirror-carrying strip to any desired curvature, substantially as set forth.

In testimony whereof I affix my signature in presence of two witnesses.

WILLIAM CALVER.

Witnesses:
HENRY CALVER,
EWELL A. DICK.